United States Patent
Bender et al.

(10) Patent No.: US 8,031,639 B2
(45) Date of Patent: *Oct. 4, 2011

(54) EFFICIENT PROBABILISTIC DUPLICATE PACKET DETECTOR IN COMPUTER NETWORKS

(75) Inventors: Carl A. Bender, Highland, NY (US); Fu Chung Chang, Rhinebeck, NY (US); Kevin J. Gildea, Bloomington, NY (US); Rama K. Govindaraju, Hopewell Junction, NY (US); Jay R. Herring, Hyde Park, NY (US); Peter H. Hochschild, New York, NY (US); Richard A. Swetz, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 49 days.

This patent is subject to a terminal disclaimer.

(21) Appl. No.: 12/561,669

(22) Filed: Sep. 17, 2009

(65) Prior Publication Data

US 2010/0008251 A1 Jan. 14, 2010

Related U.S. Application Data

(63) Continuation of application No. 11/264,529, filed on Nov. 1, 2005, now Pat. No. 7,619,993.

(51) Int. Cl.
*H04L 12/28* (2006.01)
*H04L 1/00* (2006.01)
*H04L 12/26* (2006.01)
*G01R 31/08* (2006.01)
*G06F 11/00* (2006.01)
*G06F 15/16* (2006.01)
*G08C 15/00* (2006.01)
*G08C 25/00* (2006.01)
*H04J 1/16* (2006.01)
*H04J 3/14* (2006.01)

(52) U.S. Cl. ......... 370/256; 370/252; 714/799; 709/217
(58) Field of Classification Search .................. None
See application file for complete search history.

(56) References Cited

U.S. PATENT DOCUMENTS

| | | | |
|---|---|---|---|
| 5,007,086 | A | 4/1991 | Shenoi et al. |
| 5,587,997 | A | 12/1996 | Jacobson |
| 5,610,595 | A | 3/1997 | Garrabrant et al. |
| 5,682,470 | A | 10/1997 | Dwork et al. |
| 5,781,530 | A | 7/1998 | Segal |
| 6,047,304 | A | 4/2000 | Ladwig et al. |

(Continued)

OTHER PUBLICATIONS

Office Action for U.S. Appl. No. 11/264,529 dated Jul. 15, 2008.

(Continued)

*Primary Examiner* — Daniel J Ryman
*Assistant Examiner* — Cassandra Decker
(74) *Attorney, Agent, or Firm* — Steven Chiu, Esq.; Blanche E. Schiller, Esq.; Heslin Rothenberg Farley & Mesiti P.C.

(57) ABSTRACT

In order to solve the problem of the detection of the arrival of duplicate data packets in an interconnected, multinode data processing system, each data packet is provided with a field of r bits that are randomly generated for each data packet. However, one of the packets is provided with a field that is computed from the other randomly generated field entries in a checksum computation which yields a selected nonzero checksum value. A running checksum at the receiver is used to determine whether or not, after the receipt of the specified number, k, of data packets, a duplicate packet has been received.

20 Claims, 6 Drawing Sheets

U.S. PATENT DOCUMENTS

| | | |
|---|---|---|
| 6,167,051 A | 12/2000 | Nagami et al. |
| 6,442,276 B1 | 8/2002 | Doljack |
| 6,671,264 B1 | 12/2003 | Koch et al. |
| 6,724,762 B2 | 4/2004 | Garcia et al. |
| 6,853,641 B2 | 2/2005 | Lindhorst-Ko et al. |
| 7,337,316 B1 | 2/2008 | Evans et al. |
| 7,383,490 B2 | 6/2008 | Almasi et al. |
| 7,400,626 B2 | 7/2008 | Hong |
| 7,406,082 B2 | 7/2008 | Nagarajan et al. |
| 7,478,138 B2 | 1/2009 | Chang |
| 2005/0078653 A1 | 4/2005 | Agashe et al. |
| 2007/0097875 A1 | 5/2007 | Bender et al. |

OTHER PUBLICATIONS

Office Action for U.S. Appl. No. 11/264,529 dated Nov. 10, 2008.
Final Office Action for U.S. Appl. No. 11/264,529 dated Apr. 15, 2009.

EFFICIENT PROBABILISTIC DUPLICATE PACKET DETECTOR IN COMPUTER NETWORKS

CROSS-REFERENCE TO RELATED APPLICATIONS

This application is a continuation of co-pending U.S. patent application Ser. No. 11/264,529, filed Nov. 1, 2005, entitled "Efficient Probabilistic Duplicate Packet Detector In Computer Networks," Bender et al., the entirety of which is hereby incorporated herein by reference.

BACKGROUND

The present invention is directed to the problem of detecting duplication of packets traversing various paths in a network of data processing nodes.

It is highly desirable that application programs operating in many areas such as numerically intensive computing (NIC) be provided with interface mechanisms to be able to detect packet duplication in a data processing network. NIC application programs in particular operate in a fashion in which partial results are transmitted amongst the nodes dedicated to solving various problems. Accordingly, NIC application programs and similar programs for which interchange of data packets drives efforts to improve performance would benefit from methods that promote rapid transfer of data packets without the worry of packet duplication amongst the nodes. Many applications depend on guaranteed only once notification of message transfer completion and that unwanted override of data buffers will not occur after a notification has been signaled to the ULP (upper layer protocol) or the end user.

For example, duplication may occur during the time when a network detects a cycle and modifies the links that make up the spanning tree, which is a mechanism used for routing packets in a network. The term "spanning tree" is a graph theory concept that describes a connected subset of the interconnection graph for a set of nodes in the data processing system in which all nodes and links are present but which has no closed loops. It is noted that, for any given interconnection graph, the selection and/or determination of a spanning tree is not unique. Presently networks such as Ethernet, which is one of several protocols used for data packet transmission, is one such network that may use spanning trees to determine data paths for the transmission of data packets. The spanning tree approach is employed to ensure that the same packets are not accepted by the destination network adapter twice. However, as the network topology changes (as it might as nodes are added to or dropped from a node set), there may be certain periods of time where one or more transient operating cycles may occur during which a data packet reaches a destination node more than once until the cycle is detected by the routing mechanism and certain routes are deleted to ensure that a properly formed, new spanning tree is put into place. This problem is more particularly discussed below with reference to FIGS. 1 through 5.

An example of an application that requires NIC level duplicate packet detection is the RDMA (Remote Direct Memory Access) transport protocol, where the Upper Layer Protocol (ULP) protocol expects there to be no duplication of packets in the network in order to work correctly (U.S. Pat. No. 7,478,138 entitled "Third Party, Broadcast, Multicast and Conditional RDMA Operations," issued Jan. 13, 2009). For RDMA operation, the challenge is to effectively detect the duplication at the receiving side network adapter and to not post a completion notification for the message transfer when duplication of a packet of a message occurs in the network. One cannot depend on the Upper Layer Protocol to detect and discard the duplicate packets because the ULP is not engaged in parsing each packet of an RDMA message (it is done by the network adapter). The receiving side network adapter directly moves the packets of an RDMA message to the target buffer. An additional challenge is to keep the logic that is employed to determine duplication of packets very simple and fast without requiring complex state maintenance on the adapters. In addition, one should try to ensure that the transport can take advantage of physical switches with multiple routes between a pair of nodes; the transport should not require in-order-delivery of packets.

Others have tried to solve the problem of duplicate data packet transport in different ways. For example, in U.S. Pat. No. 7,400,626 entitled "Processing a Duplicate Data Packet," issued Jul. 15, 2008, there is described a method for detecting duplicate packets by checking a timestamp in the packet against the timestamp of the last good packet received and checking an event bit that indicates whether the device is in the active or inactive state. This is quite different than the present invention since the present invention involves no time stamps; however, the basic problem being solved is similar.

Additionally, the problem being addressed in U.S. Pat. No. 7,406,082 entitled "Sequence Number Schemes for Acceptance/Rejection of Duplicated Packets in a Packet-Based Network," issued Jul. 29, 2008, is also similar to the problem being addressed by the present invention. However, what is quite different is the notion of employing sequence number schemes for the acceptance and/or rejection of duplicated packets in a packet based transmission environment. Also, in U.S. Patent Publication No. 2005/0078653 A1, entitled "A Method and Apparatus for Data Communications Over Multiple Channels," published Apr. 14, 2005, the authors therein describe an approach that is directed to the communication of data over multiple channels using a method that uses sequence-number based duplication as a foundation for "filtration" (that is, elimination) of duplicate packets. By way of contrast, however, the problems associated with the storage requirements needed for sequence-number based filtration are precisely what has motivated the development of the present. Other than the discussions therein related to packet duplication detection the published patent application bearing U.S. Patent Publication No. 2005/0078653 A1 is not germane to the present application.

The work described in U.S. Pat. No. 6,167,051 entitled "Network Node and Method of Packet Transfer," issued Dec. 26, 2000, concerns scheduling and routing of multicast traffic and a means therefor for avoiding the generation of duplicate packets. The work does not concern the filtration of duplicates data packets and is not germane to the present application.

The work described in U.S. Pat. No. 6,853,641 entitled "Method of Protecting Traffic in a Mesh Network," issued Feb. 8, 2005, describes the purposeful transmission of duplicate packets to ensure high reliability over a network and the marking of the packets with sequence numbers so that the receiver can discard duplicates and recreate the original packet stream. As such, it is not only significantly different than the present invention, it actually teaches away from the main principles of the present invention, namely, the avoidance of duplicate data packet generation and transmission.

U.S. Pat. No. 5,610,595 entitled "Packet Radio Communication System Protocol," issued Mar. 11, 1997, describes an approach to packet duplication detection based on a repeat count in the transmitted packet. Apart from this as being a significant difference, the radio aspects of this system do not suggest one of the major causes for data packet duplication discussed herein, namely changes in the number and connections of nodes in the network.

U.S. Pat. No. 6,671,264 entitled "Method for Detecting Invalid Packets by Assigning Super Transaction Number," issued Dec. 30, 2003, also is inapposite to the present invention, not only since it uses transaction numbers (similar to the sequence number approach) but also because it seeks in its operation to stifle the transmission of duplicate data packets at the source, as opposed to the problem arising from changes in the network interconnection graph structure.

The mechanism described in the present application is also different than the standard sliding window based protocols used to detect ghost and duplicate packets. In addition, the duplicate packets in that approach are inserted by the sender after a predetermined timeout. The duplicate packets inserted by the sender also have a special bit set to signify that it is a duplicate transmission which the receiver uses to check for duplicate detection purposes.

There are many differences between the invention described herein versus what is provided in the prior art. The present invention has the following superior attributes:

1. The receiving side does not require that duplicate packets be marked with a special bit.

2. There is no need for a sliding window protocol or the associated state maintenance. This mechanism eliminates the need for the receiving side to send periodic acknowledgements to ensure that the flow control window on the send side can be advanced.

3. In addition this does not unnecessarily throttle the send side if the acknowledgements from the receive side are delayed as often occurs in standard sliding window protocols.

4. In U.S. Pat. No. 7,406,082 referenced above, the receiver has to keep a timer to figure out if a packet has aged in the network beyond the expected time if it arrives out of sequence or if the sequence number of the arriving packet is less than that of the last sequence number that was received. No such expected time based checking is needed on the receiving side in the present invention.

5. The overall efficiency of the present method, in terms of the order of instructions and the amount of necessary state information is far superior as compared to other approaches.

BRIEF SUMMARY

Thus, there is provided herein a computer program product for detecting the presence of duplicate data packets in a multi-packet message in a multinode data processing system. The computer program product includes, for instance, a storage medium readable by a processor and storing instructions for execution by the processor for performing a method including transmitting, by a first node to at least one receiving node, a plurality of data packets, the transmitted data packets, except for one such data packet, having a field therein with bits that are randomly generated, and the field of the excepted data packet being preset to be a function of the randomly generated bits in the other data packets; for each data packet received at the at least one receiving node, accumulating a checksum of the fields; and detecting based on the accumulated checksum whether a duplicate packet is present.

Methods and systems relating to one or more aspects of the present invention are also described and may be claimed herein.

Accordingly, it is an object of the present invention to provide a mechanism for the detection of duplicate data packets in an interconnected network of data processing elements or nodes.

It is a further object of the present invention to enhance the usefulness and utilization of RDMA capability over UD transport protocols.

It is also an object of the present invention to provide a method for data packet duplication detection that can be made arbitrarily accurate in terms of reducing the probability of error by enlarging the field in the packet containing the random bits.

It is yet another object of the present invention to provide a data packet duplication detection protocol that simplifies the design of network adapters.

It is a still further object of the present invention to provide a mechanism for detecting data packet duplication that does not require counting, timing, and acknowledgements for packets, sliding window protocols or other complex state tracking to detect duplication.

It is also an object of the present invention to reduce performance impacts resulting from changes in network topology.

Lastly, but not limited hereto, it is an object of the present invention to improving the operation and performance of interconnected data processing networks and their usage in transport models which must avoid the receive side accepting duplicate packets.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE SEVERAL VIEWS OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Figure 1:
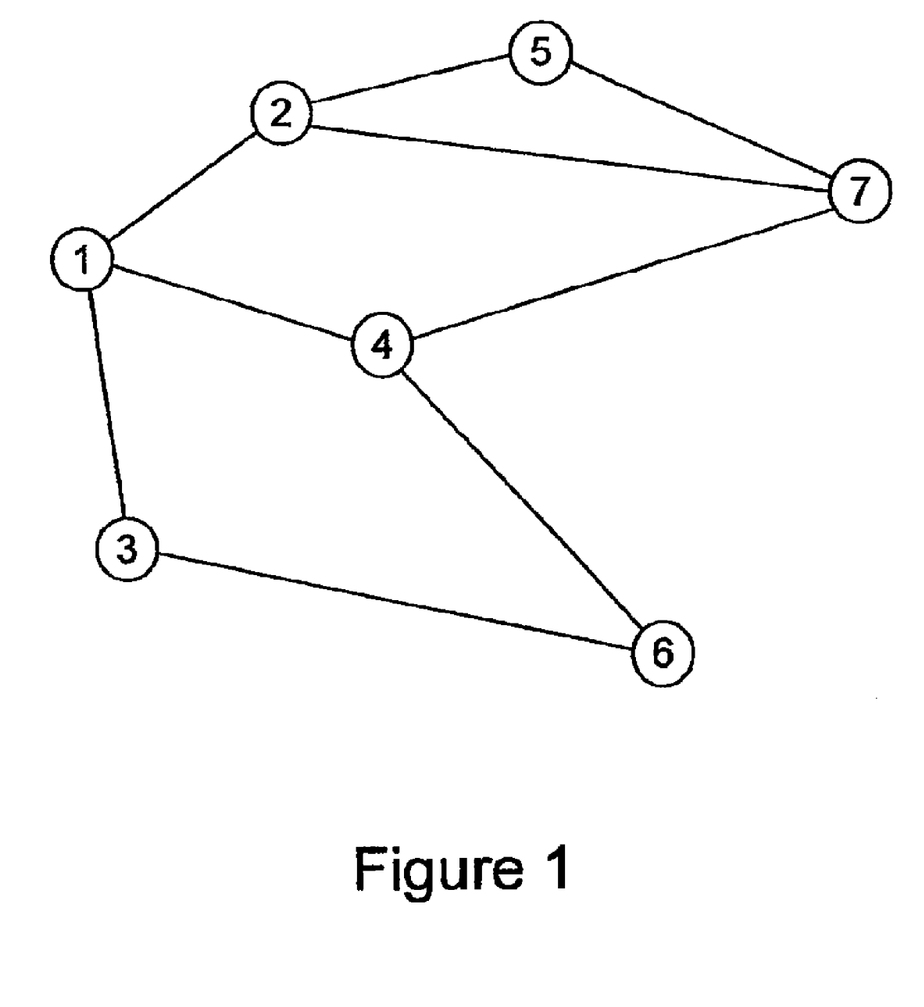
FIG. 1 is a graph depicting a starting configuration for network interconnections usable for data packet transmission.
Figure 2:
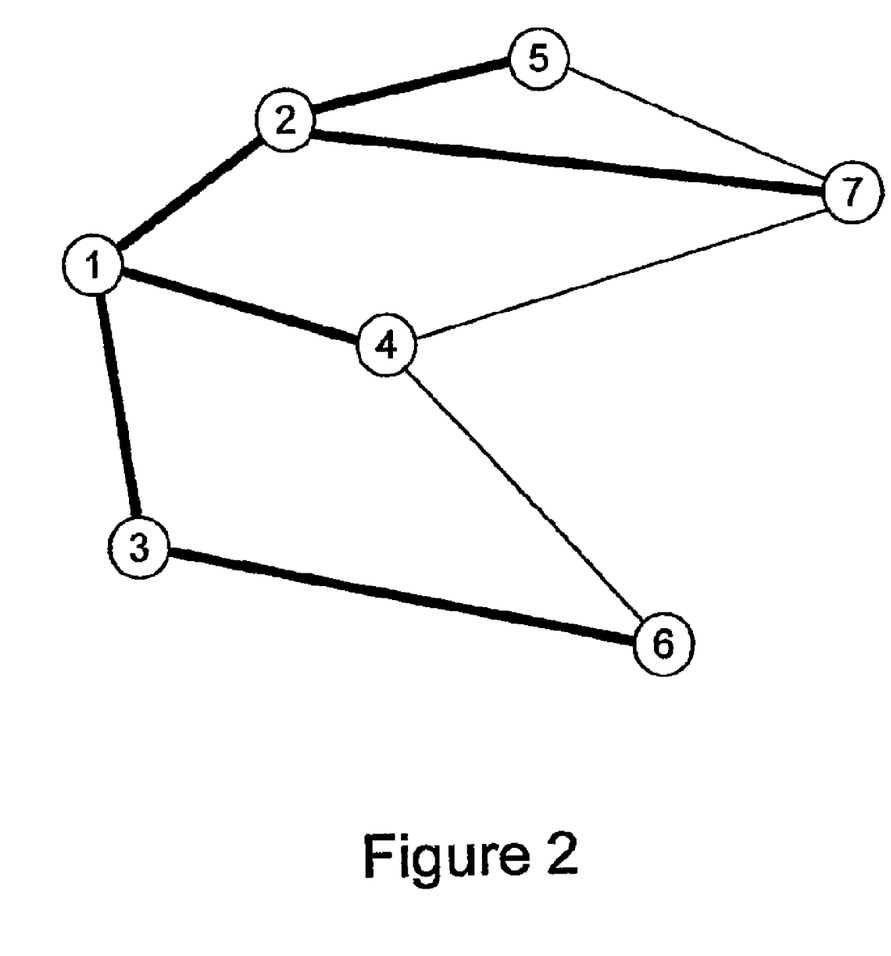
FIG. 2 is a graph identical to the graph shown in FIG. 1 but more particularly showing in bold those links that are part of a spanning tree for the graph usable for avoiding duplicate data packet receipt.
Figure 3:
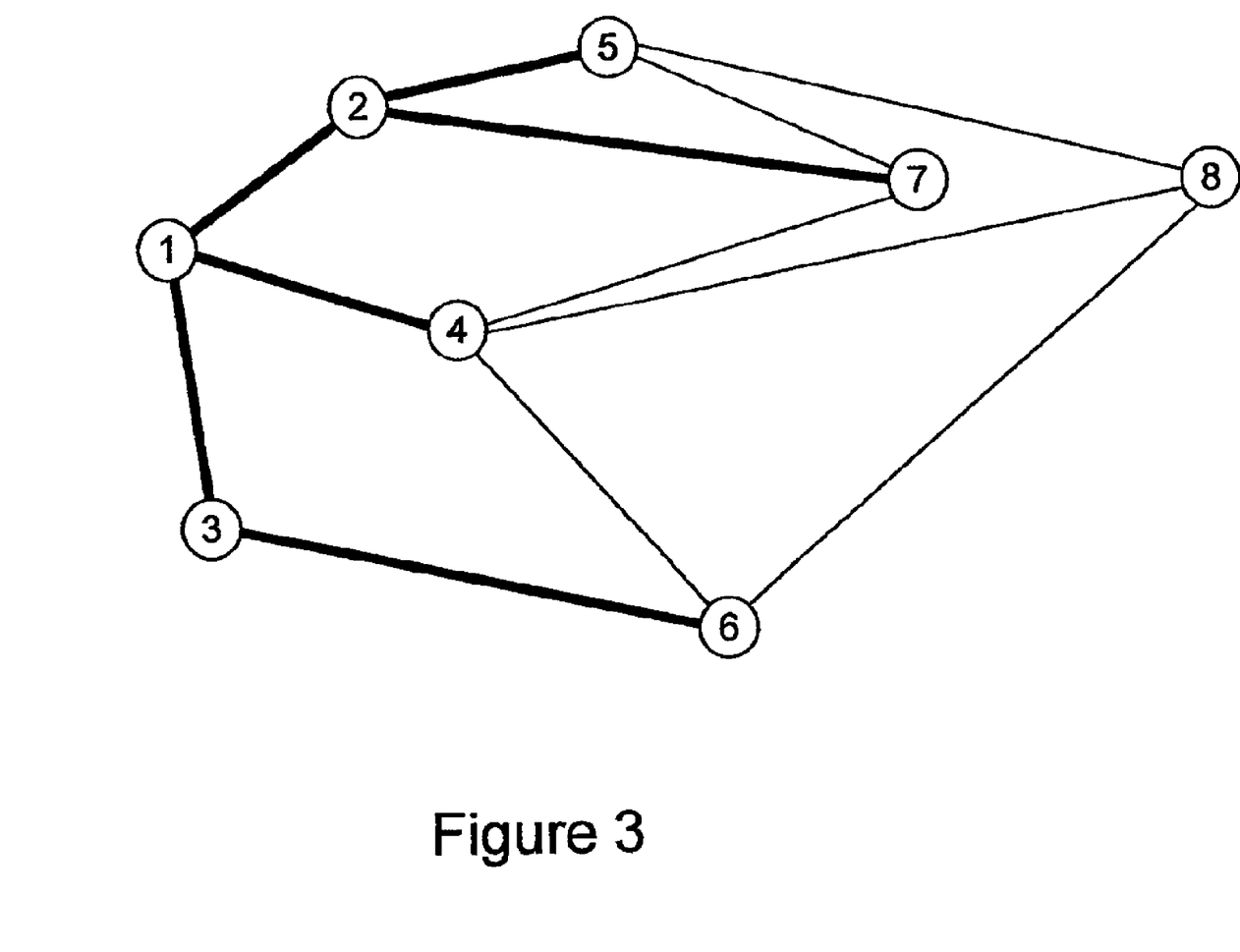
FIG. 3 is a graph which is identical to the graph shown in FIG. 2 but which now indicates a change in interconnections brought about by the introduction of a new node.
Figure 4:
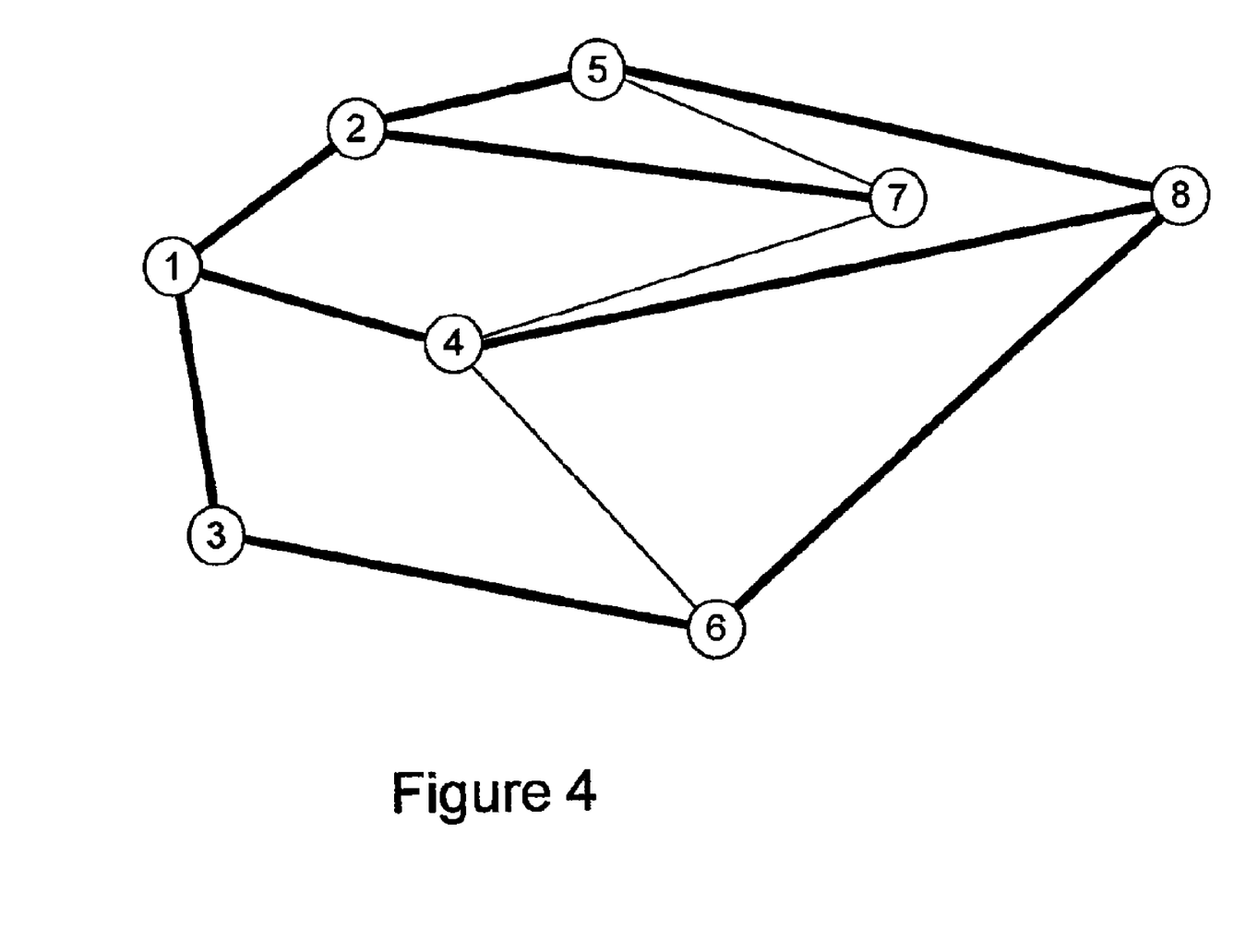
FIG. 4 is a graph which is identical to the graph shown in FIG. 3 but which now shows certain links in bold as an initial step in the construction of a new spanning tree.
Figure 5:
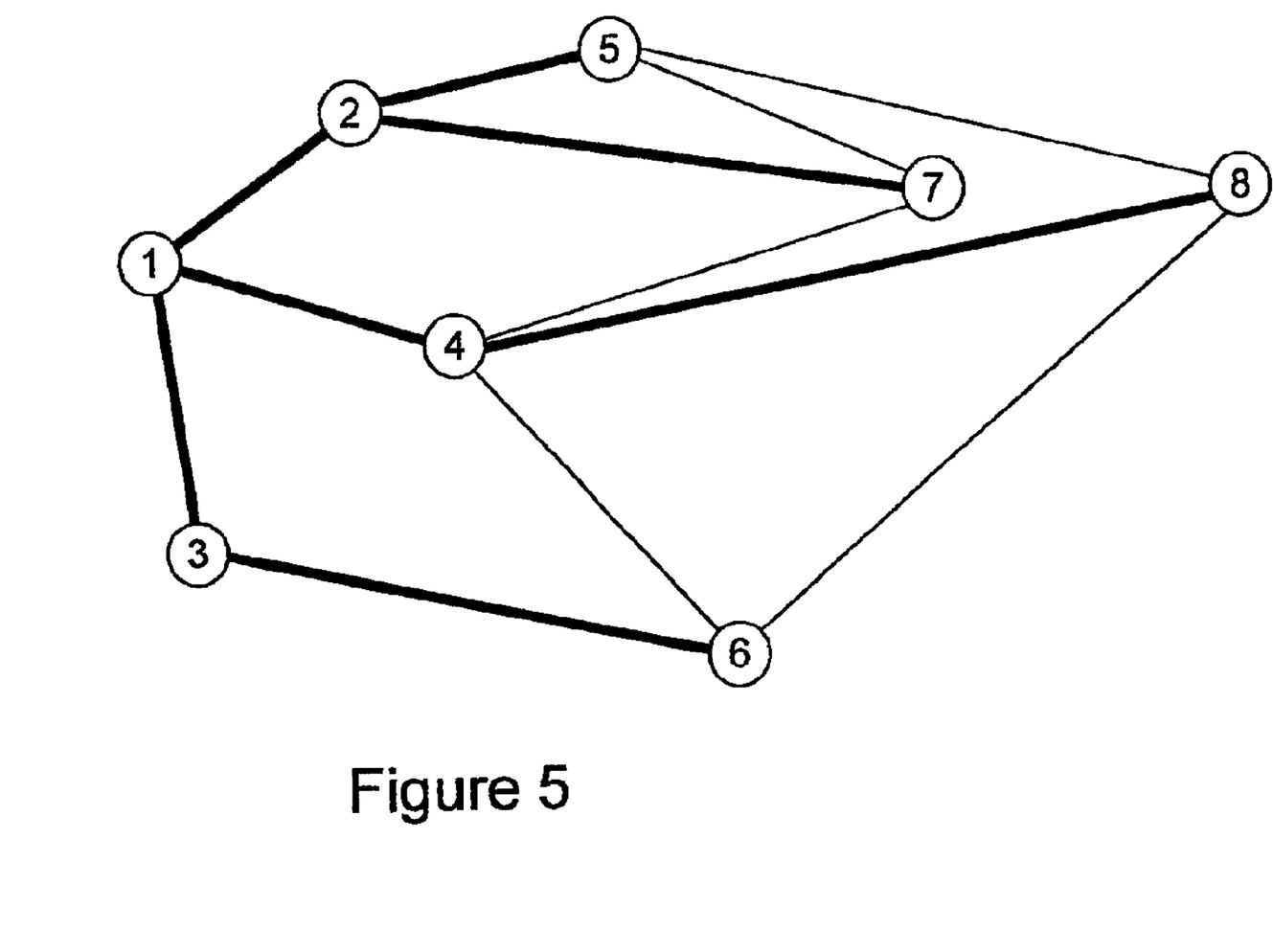
FIG. 5 is a graph which is identical to the graph shown in FIG. 4 but which now shows a spanning tree suitable for the network with the newly added node.

Before providing a solution to the problems alluded to above, it is appropriate to provide a more detailed description of the nature of the problem being solved. Accordingly, FIG. 1 illustrates an exemplary initial network configuration. For purposes of enhancing the understanding of the structure and function of the present invention, the number of nodes is limited to 7. However, it should be understood that in practice the number of nodes typically ranges in the hundreds or thousands (or even larger). Based on the configuration shown, an example spanning tree for routing is constructed as shown in darker lines in FIG. 2. Between any two nodes in the network in FIG. 2, there is only one way to get to the other node using the spanning tree (by the definition of the structure of a spanning tree as having no closed loops). The routing protocol forwards the packets of a message to the destination node via the spanning tree links. This ensures that a data packet is never delivered more than once. As shown in FIG. 3, the topology of the configuration can change, for example by the addition of a node in the network with links from one or more nodes in the configuration to the new node (node 8 in this example). Since node 8 is new and is connected to nodes 5, 6, and 7, initially all of them may want to add their links to node 8 into the spanning tree (See FIG. 4). Thus, a packet from node 1 to node 8 can potentially arrive 3 times at node 8 (once each from nodes 4, 5 and 6). For normal Internet Protocol (IP) based transport where data packets are staged through the IP stack on the host, the duplication of packets can be easily detected via packet sequence numbers as the upper layers of the IP protocol (TCP) parses through the header of the packet. Node 8 can then trim down the spanning tree links from nodes 5 and 6 (and chose to add the link between node 4 and node 8 in the spanning tree). FIG. 5 shows the new spanning tree. So, for a short duration of time between the states illustrated in FIGS. 1 and 5, some packets may arrive more than once at node 8. Additionally, it is also noted that it is possible for packets sent by node 8 to some of the other nodes to also result in packet duplication.

Having now arrived at a more detailed understanding of the packet duplication problem, a solution to it is now presented. The proposed solution is a probabilistic checksum based approach. Each packet i (except the last packet) of an RDMA (RDMA is used as an example application here) message has an r bit random value h[i] added in the header. The last packet k of a message has a special value for h[k] such that $$h[1]+h[2]+h[3]+\ldots+h[k]=q; \quad (1)$$

where "q" is some predefined non-zero checksum value and the "+" sign in the expression above in Equation 1, and in the rest of this document refers to XOR (the exclusive OR) operation unless specifically mentioned otherwise. The sending side and receiving side network adapters maintain a running checksum of the h values of each packet of the message.

It is noted that while preferred implementations of the present invention deploy the added random r bit field in the packet header, other protocols are possible with this field provided elsewhere in the data packet. The only requirement is that the field be transmitted with the data packet and both send and receive side adapters agree on the exact location in the packet where this random value starts and its length.

The receiving side adapter computes the XOR checksum C of the first k packets of a message it receives and verifies that the checksum C=q. If the checksum matches, then it can be safely assumed, with a very high probability that no packet duplication occurred in the transfer of the message. If C≠q, then the receiving side application program (NIC, for example) concludes that packet duplication has occurred in the network.

This method has several significant advantages:

(1) Since XOR operations are independent of the order of transmission or receipt, the packets of this message can arrive out of order. This is a significant advantage in terms of packet tracking and exploiting potential parallelism in the network through multiple paths between any source destination pair allowing different packets of a message to traverse through different routes in the switch. This facet arises since the XOR operation is both associative and commutative.

(2) The space requirement on the adapter is just an r bit value per in-flight message for the end point network adapters in question. Hence the space requirement for this algorithm is r bits per in-flight message. The sending and receiving side NICs can compute the expected number of packets per message by a simple computation from the length of the message and payload per packet. (3) There is no additional state maintenance necessary for this algorithm. (4) The XOR of a value with itself results in a 0 checksum. Thus, if a packet arrives at the destination an even number of times, it is the same as if it never arrived in terms of the net checksum. (5) The XOR of a value an odd number of times has the same effect as if the XOR operation was performed only once. Thus, a packet arriving an odd number of times is the same as the packet arriving only once in terms of the contribution to the checksum. (6) The decision on the checksum value and whether it matches the expected checksum C by the receive side network adapter is made as soon as k packets of the message have been received. Subsequent packets of the message are discarded by the receiving side adapter as duplicates. (6) The overall computation overhead per packet at both the sending side and the receiving side network adapters is 0(1).

It is noted that the probability of a packet getting duplicated in the network is itself small (since it would require a person to be changing the configuration, for example) and hence the overall probability of the checksum matching with a replicated packet needs to be multiplied with the already small probability of a packet being replicated.

For a better understanding of the operation, its elegance and advantages of the present method a mathematical analysis is provided below. Attributes 4 and 5 above help simplify this analysis considerably.

Each of the first k−1 packets of a k packet sequence is assigned an independently chosen r-bit random hash value h[j]. The hash value of the last packet is set to $$q+h[1]+h[2]+\ldots+h[k-1] \quad (2)$$

Then the checksum over the sequence of k packets is given by:

$$\begin{aligned} C &= \{h[1] + h[2] + \ldots + h[k-1]\} + h[k] \quad (3) \\ &= \{h[1] + h[2] + \ldots + h[k-1]\} + \\ &\quad \{h[1] + h[2] + \ldots + h[k-1] + q\} \\ &= q. \end{aligned}$$

We are interested here in the case where the packet stream is disrupted by packet duplication or packet drop. Note that the receiver never accepts more than k packets of a k-packet transaction and that an error is unconditionally detected if fewer than k packets arrive via timeouts (for example, see the above referenced RDMA over UD patent application).

We characterize a disruption in the following way. Let m[j] be the numbers of times that packet j is received. Since we've received a total of k (possibly duplicated) packets, $$m[1]+m[2]+,\ldots+m[k]=k \quad (4)$$

We do not attempt to compute here the probability that a given disruption occurs. Instead, for each disruption, we show that it is detected with very high probability (that is, for almost all assignments of hash values, the packet sequence checksum is incorrect).

Determining the probability of a given disruption is not a particularly well defined problem. Among other factors, packet duplication is typically the result of human activity (for example, adding a node to an existing configuration). It is asserted that if disruptions are detected with sufficiently high probability, we are safe (and r can be made larger to satisfy the probabilistic safety needs here).

Note that in the following discussion, the cases encountered depend only on the disruption, and not on the hash values.

Let v[1], v[2], . . . v[k'] be the indices j at which m[j] is odd. Then the checksum C of the received sequence of k packets is $$C=h[v[1]]+h[v[2]]+ \ldots +h[v[k']] \quad (5)$$

The analysis is divided into several cases, as shown below:

Case 1: k'=0

In this case, wherein all received packets were received an even number of times, C=0, hence C cannot be equal to q. In this case, such errors are detected with probability 1.

Case 2a: m[k] is even.

In this case, the last packet (with hash value h[k]) does not contribute to C. Thus, C is the sum of k' independently chosen random r-bit values. Therefore C takes a uniformly distributed random value and thus C equals q with probability $2^{-r}$.

$$P_{2a}(C=q)=2^{-r} \quad (6)$$

Case 2b: m[k] is odd.

In this case, h[k] does contribute to C. Let w[1], . . . w[k"] be the indices j at which m[j] is even (that is, the complement of v such that k'+k"=k). Now we have two subcases to consider (Subcase 2b1 and Subcase 2b2):

Subcase 2b1: k">0.

In this case:

$$C=h[v[1]]+h[v[2]]+ \ldots +h[v[k']]$$

$$C=h[v[1]]+h[v[2]]+ \ldots +h[V[k'-1]]+\{q+h[1]+h[2]+ \ldots +h[k'-1]\}$$

$$C=q+h[w[1]]+h[w[2]]+ \ldots +h[w[k"]] \quad (7)$$

Thus C is the sum of a constant plus a set of independent random values, and hence C equals q with probability $2^{-r}$.

Subcase 2b2: k"=0.

In this case all packets arrived with odd multiplicity, hence each packet must have arrived exactly once, and hence C=q and there are no duplicates.

It is of importance to note that the size (in terms of number of bits) of the checksum variable r can be set in accordance with the probability desired.

The present method provides the following advantages over deterministic approaches:

1. It satisfies a key requirement for some emerging transport protocols (e.g. the RDMA over UD model as described in the above referenced patent application.

2. Very little state maintenance is required and a 0(1) overhead is provided as compared to much more complex approaches suggested in literature of deterministic sliding window protocols.

3. This keeps the network adapter hardware design very simple.

4. There are no additional flow control limits imposed by this approach. (no packet level acknowledgements necessary and no send side throttling waiting for ACKS (acknowledgements) to advance flow control sliding windows).

5. The present method does not require in-order delivery of message packets.

6. Does not require any additional hooks in the Upper Layer Protocol (ULP) for this approach. The design is completely contained within the network adapters.

Figure 6:
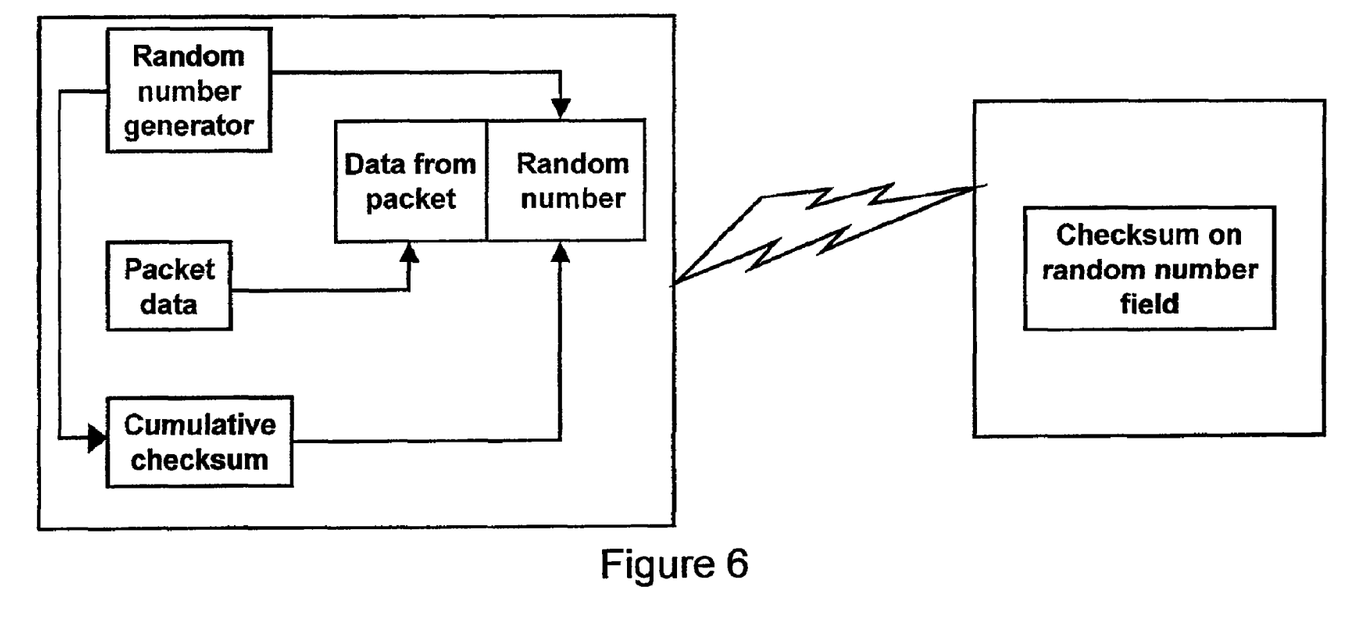
FIG. 6 is a block diagram illustrating the process of the present invention.

Accordingly, it is seen from the above that there is provided a simple probabilistic algorithm that has been designed to detect possible packet duplication in the network and to discard such messages. This is an important feature which allows efficient RDMA over UD transport in networks of data processing nodes. The algorithm employs very simple hardware enhancements and incurs very little overhead. For practical purposes, the present approach provides significant advantages over other methods used to solve the same problem. See FIG. 6.

The method can be augmented to deterministically detect packet duplication in messages comprised of r or fewer packets. This can be accomplished by setting the checksum field of the k'th packet to 2k, and checking that the sum of the received checksums amounts to 1+2+4+ . . . +2r.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A computer program product for detecting the presence of duplicate data packets in a multi-packet message in a multinode data processing system, the computer program product comprising:
   a non-transitory storage medium readable by a processor and storing instructions for execution by the processor for performing a method comprising:
   transmitting, by a first node to at least one receiving node, a plurality of data packets, the transmitted data packets, except for one such data packet, having a field therein with bits that are randomly generated, and the field of said excepted data packet being preset to be a function of the randomly generated bits in the other data packets;
   for each data packet received at said at least one receiving node, accumulating a checksum of said fields; and
   detecting based on said accumulated checksum whether a duplicate packet is present.

2. The computer program product of claim 1, wherein the method further includes changing the number of nodes in the multinode data processing system.

3. The computer program product of claim 1, wherein said excepted packet is the last packet to be transmitted.

4. The computer program product of claim 1, wherein the field of said excepted data packet, in response to being XORed with the random bits in the fields of said other data packets, produces a value, q.

5. The computer program product of claim 1, wherein said plurality of data packets do not arrive in the same order in which said plurality of data packets were transmitted.

6. The computer program product of claim 1, wherein said fields of randomly generated bits have a uniform probability distribution.

7. The computer program product of claim 1, wherein the method includes indicating an error if fewer than a specified number of data packets have arrived within a pre-defined timeout value.

8. The computer program product of claim 1, wherein different packets of the multi-packet message traverse different routes in the multinode data processing system.

9. The computer program product of claim 1, wherein the function to which the field of said excepted data packet is preset is the exclusive-or summation of said fields of randomly generated bits in said other packets.

10. The computer program product of claim 1, wherein there is a constant number of r state bits per in-flight message on send and receive side adapters, and a simple XOR operation per packet is performed on each of said receive side adapters.

11. A computer system for detecting the presence of duplicate data packets in a multi-packet message in a multinode data processing system, the computer system comprising:
  at least one receiving node, each receiving node comprising:
  a memory storing instructions; and
  a processor in communications with the memory wherein the processor is configured to perform a method when executing the instructions stored in the memory, said method comprising:
  receiving, by the respective receiving node, a plurality of data packets transmitted by a first node, the received data packets, except for one such data packet, having a field therein with bits that are randomly generated, and the field of said excepted data packet being preset to be a function of the randomly generated bits in the other data packets;
  for each data packet received at said at least one receiving node, accumulating a checksum of said fields; and
  detecting based on said accumulated checksum whether a duplicate packet is present.

12. The computer system of claim 11, wherein the method further includes changing the number of nodes in the multinode data processing system.

13. The computer system of claim 11, wherein the field of said excepted data packet, in response to being XORed with the random bits in the fields of said other data packets, produces a value, q.

14. The computer system of claim 11, wherein said fields of randomly generated bits have a uniform probability distribution.

15. The computer system of claim 11, wherein different packets of the multi-packet message traverse different routes in the multinode data processing system.

16. The computer system of claim 11, wherein the function to which the field of said excepted data packet is preset is the exclusive-or summation of said fields of randomly generated bits in said other packets.

17. The computer system of claim 11, wherein there is a constant number of r state bits per in-flight message on send and receive side adapters, and a simple XOR operation per packet is performed on each of said receive side adapters.

18. A method of detecting the presence of duplicate data packets in a multi-packet message in a multinode data processing system, said method comprising:
  transmitting, by a first node to at least one receiving node, a plurality of data packets, the transmitted data packets, except for one such data packet, having a field therein with bits that are randomly generated, and the field of said excepted data packet being preset to be a function of the randomly generated bits in the other data packets;
  for each data packet received at said at least one receiving node, accumulating a checksum of said fields; and
  detecting based on said accumulated checksum whether a duplicate packet is present.

19. The method of claim 18, wherein the field of said excepted data packet, in response to being XORed with the random bits in the fields of said other data packets, produces a value, q.

20. The method of claim 18, wherein there is a constant number of r state bits per in-flight message on send and receive side adapters, and a simple XOR operation per packet is performed on each of said receive side adapters.

* * * * *